H. P. LORENZEN.
Method and Apparatus for Obtaining Ammonia.
No. 232,991.          Patented Oct. 5, 1880.
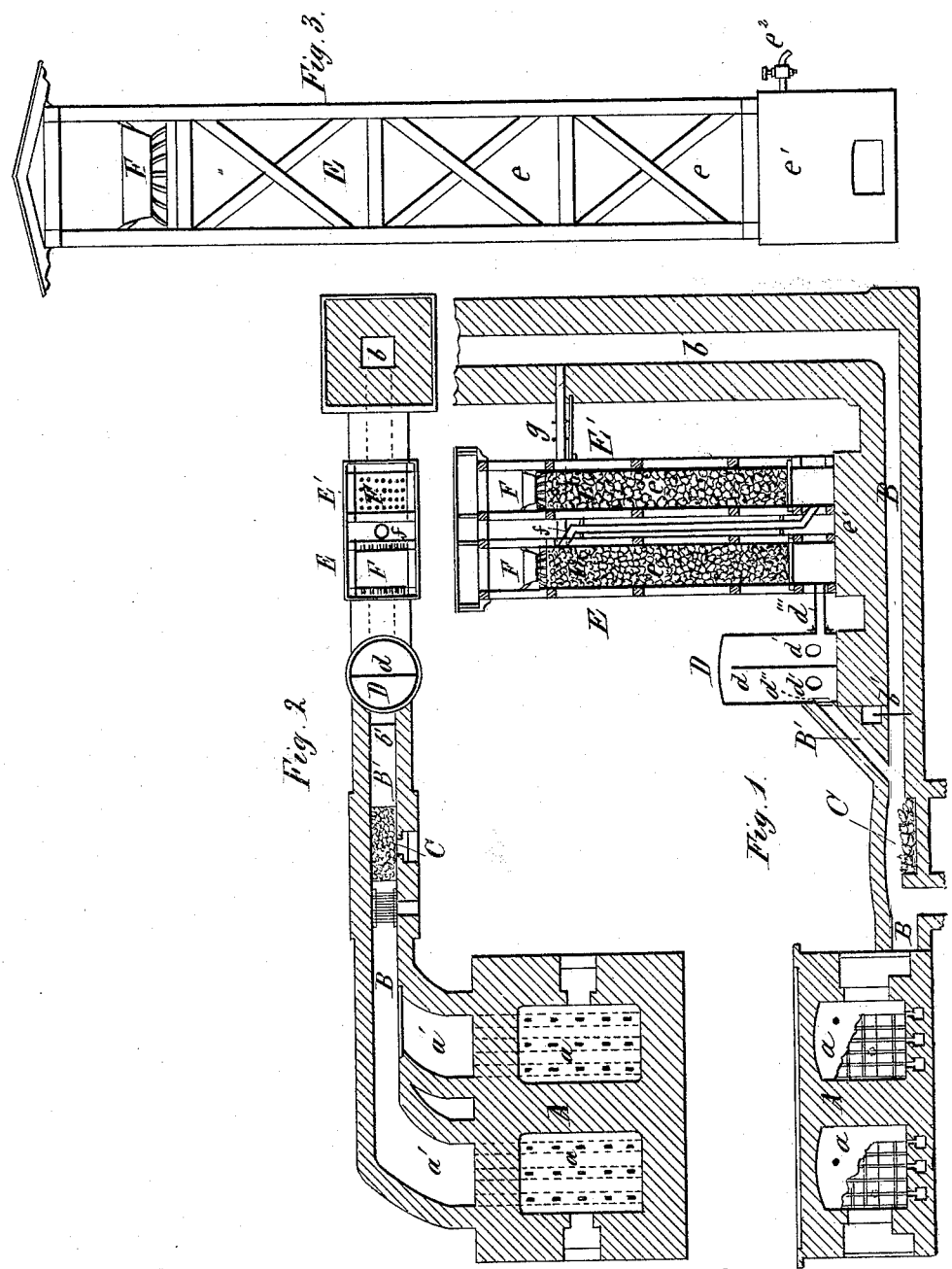

UNITED STATES PATENT OFFICE.

HANS P. LORENZEN, OF FRIEDRICHSTADT, SCHLESWIG-HOLSTEIN, GERMANY.

METHOD AND APPARATUS FOR OBTAINING AMMONIA.

SPECIFICATION forming part of Letters Patent No. 232,991, dated October 5, 1880.

Application filed January 29, 1880.

*To all whom it may concern:*

Be it known that I, HANS PETER LORENZEN, a resident of Friedrichstadt, Schleswig-Holstein, in the German Empire, have invented new and useful Improvements in Obtaining Ammonia out of Bones or other Azotic Materials, and also a combination of apparatus therefore, of which the following is a specification.

The calcination or carbonization of bones for the refining of sugar or other industrial purposes is usually effected in cast-iron pots or vessels subjected to the action of heat in a brick-kiln or furnace, in which process the products of distillation or carbonization are lost.

Another method consists in calcining the comminuted bones in close retorts and conducting the products of distillation through a vessel or vessels filled with water or sulphuric acid, whereby a portion of the ammonia, either as a carbonate or sulphate, is recovered. In this method, however, the products of distillation are carried off slowly, and a large portion of the oil or tar is burned with the bones, which has the effect to destroy, to a great extent, their absorbent powers, and deteriorates the value of the burned or calcined bones to such an extent as not to be compensated by the value of the ammonia recovered, which led to the abandonment of the process in all cases where the result in view consisted of the calcined bone.

The object of my invention is to recover the ammonia without deteriorating the bone product; and it consists, essentially, first, in the method of obtaining the ammonia from the products of distillation of the bone without thereby affecting its quality as a decolorizing agent in the manufacture of sugar, or for use in other industrial branches; and, secondly, in the combination, with a carbonizing-furnace, of appliances or apparatus to carry into effect the above process.

In carrying out the process the comminuted bones are calcined in the usual cast-iron vessels by subjecting them to the action of heat in any usual form of brick-kiln or furnace, A, Figures 1 and 2, which figures represent, in vertical transverse section and in horizontal transverse section, one of the usual calcining-furnaces, having the calcining-chambers $a$ and appliances for the recovery of the ammonia. Fig. 3 is an enlarged view of the frame-work of the coke-tower.

The smoke or products of combustion arising from the first or initial firing pass through the duct B into the chimney $b$, and thence to the atmosphere. Interposed in the duct B is a reverberatory hearth, C, or furnace containing a layer of hot oxide of calcium; and the duct or flue B is further provided with a damper, $b'$, to divert the course of the products of distillation and combustion from the chimney $b$ into the flue B', which damper is closed as soon as the calcination of the bones commences, when the products of distillation from the calcining-chambers are conducted over the incandescent oxide of calcium, where certain gases and the tar products are consumed; and I have found by experience that incandescent calcium oxide has the property of decomposing the products of distillation and tends to facilitate the conversion of the nitrogenous gases into ammonia.

Instead of employing a layer of oxide of calcium the walls and hearth of the furnace C may be lined with it, in order to increase the superficial area of oxide of calcium with which the gases come in contact.

From the furnace C the gases pass up the flue B' into an iron cooler, D, provided with a central vertical transverse partition, $d$, reaching nearly to the upper part thereof, to compel the gases to ascend to the top of the cooler on one side and descend to its bottom on the opposite side, where they escape. In this manner the gases are exposed to a more extended cooling-surface than would be the case otherwise.

The cooler D is provided with a valve or damper, $d''$, and man-holes $d'$, the former to divert the products of combustion from the cooler into the flue B when the fires are first started, and the latter for removing the ammonia, a large portion of which is deposited upon its walls in the form of carbonate of ammonia. From the cooler D the gases pass through pipe $d'''$ into a tower, E, lined with lead and filled with coke, on top of which is a reservoir, F, containing sulphuric acid.

The vessel F has in its bottom a series of pipes, through which the sulphuric acid is allowed to pass in very fine streams upon the coke, which latter serves to disseminate the sulphuric acid over the entire interior space of the tower and meet and absorb the ammoniacal gases in its slow progress to the bottom of the tower, in which is a receiver, $e'$, provided with a stop-cock, $e''$, from which the sulphuric acid is drawn from time to time to be reconveyed to the vessel F, until the sulphuric acid is saturated with the ammonia eliminated from the products of distillation.

$E'$ is a second tower, in all respects like tower E, and connected therewith by a lead pipe, $f$, communicating with tower E at or near its upper end, and with tower $E'$ at or near its lower end, as shown. This pipe $f$ is provided with a suitable valve or damper at its upper end, to shut off the communication between the two towers.

From the tower E the gases are finally conducted to tower $E'$, where they again come in contact with the sulphuric acid trickling down through the coke from the reservoir F, and where the last traces of ammonia are absorbed.

As long as the sulphuric acid in tower E is not saturated it will absorb all the ammonia combined with the gases that pass up into the tower E, and during this time the communication between E and $E'$ is shut off and the remaining gases not absorbed by the sulphuric acid pass from the tower E direct into the chimney $b$, through pipe or flue $g$, which is also provided with a suitable valve or damper to shut off the communication between said tower and chimney when it is desired to conduct the gases through tower $E'$.

In this manner I am enabled to convert the largest portion of the nitrogenous substances contained in bones or other material into ammonia, and without impairing the value of the calcined product.

Having now described my invention, I would have it understood that I do not limit myself to the exact description of appliances as shown and described, as these may be greatly varied without departing from the peculiar nature of my invention; nor do I wish to claim, broadly, the recovery of ammonia from bones or other like nitrogenous substances; but

What I do claim is—

1. The process, in recovering ammonia from nitrogenous substances by distillation, which consists in developing the ammonia before fixation by bringing the gas in contact with incandescent oxide of calcium, substantially as described, and for the purpose specified.

2. The process of recovering ammonia from nitrogenous substances by distillation, which consists in first developing the ammonia from the gases produced by contact with incandescent oxide of calcium; secondly, subjecting these to a cooling agent for the purpose set forth, and, lastly, subjecting said gases to the action of sulphuric acid, substantially as described.

3. The combination, with a calcining-furnace, of a reverberatory furnace or hearth, the cooler D, and towers E $E'$ and their respective connections, and means, substantially as described, for connecting the furnaces and the towers with a common chimney or stack, working either simultaneously or independently, as and for the purposes specified.

In witness that I claim the foregoing I have hereunto set my hand this 10th day of December, 1879.

HANS PETER LORENZEN.

Witnesses:
  C. KESSELER,
  ROB. OETERS.